United States Patent [19]

Hoh

[11] 4,172,939

[45] Oct. 30, 1979

[54] VULCANIZABLE ETHYLENE/VINYL ACETATE/CARBON MONOXIDE TERPOLYMERS

[75] Inventor: George L. Hoh, Wilmington, Del.

[73] Assignee: E. I. Du Pont de Nemours and Company, Wilmington, Del.

[21] Appl. No.: 937,728

[22] Filed: Aug. 29, 1978

[51] Int. Cl.$^2$ .............................................. C08G 81/00
[52] U.S. Cl. .................................................. 528/392
[58] Field of Search .......................................... 528/392

[56] References Cited

U.S. PATENT DOCUMENTS

| | | | |
|---|---|---|---|
| 2,495,286 | 1/1950 | Brubaker | 528/392 |
| 3,780,140 | 12/1973 | Hammer | 528/392 |

*Primary Examiner*—Lester L. Lee

[57] ABSTRACT

A vulcanizable composition comprising an ethylene/vinyl acetate/carbon monoxide terpolymer, said terpolymer containing about 5–30%, by weight, carbon monoxide, and having dispersed therein a vulcanizing agent of elemental sulfur or a compound that releases sulfur at vulcanization temperatures. The cured elastomer is useful for making hose, belts, wire coverings and other elastomeric articles in a conventional manner.

11 Claims, No Drawings

VULCANIZABLE ETHYLENE/VINYL ACETATE/CARBON MONOXIDE TERPOLYMERS

BACKGROUND OF THE INVENTION

This invention relates to sulfur curable ethylene/vinyl acetate copolymer compositions.

Elastomeric ethylene/vinyl acetate copolymers known heretofore can be vulcanized only with peroxides; they do not undergo sulfur cure. Elastomers that are sulfur curable have distinct advantages over those that are peroxide curable only. For example, operating hazards exist using peroxides to cure elastomers. Further, the resulting peroxide cured elastomers have an objectionable odor, and, more importantly, useful additives frequently incorporated in elastomers to improve physical properties, e.g., processing oils and plasticizers, cannot be used with peroxide cures because they compete for the peroxide and prevent attainment of an adequate state of cure. Although ethylene/vinyl acetate copolymers have been modified by the addition of halogen-containing functional groups or reaction with sulfonic acids to generate sulfur cure sites on the copolymer, these polymers are quite expensive to manufacture. There is a need for sulfur curable ethylene/vinyl acetate elastomers having good physical properties.

SUMMARY OF THE INVENTION

This invention is based on the discovery that an ethylene/vinyl acetate copolymer containing copolymerized carbon monoxide can be sulfur cured. More specifically, it has been discovered that a vulcanizable composition comprising an ethylene/vinyl acetate/carbon monoxide terpolymer containing about 5–30%, by weight, carbon monoxide and, dispersed therein, a vulcanizing agent selected from elemental sulfur, a compound that releases sulfur at vulcanization temperatures, and mixtures thereof when cured has excellent physical properties. Generally, the terpolymer contains, by weight, 40–80% ethylene, 15–60% vinyl acetate, and 5–30% carbon monoxide. Usually, for best results, a conventional organic accelerator is incorporated in the vulcanizable composition to increase the rate and effectiveness of the sulfur cure. The sulfur vulcanizable terpolymers are suitable for making hose, belts, wire covering and other elastomeric articles by conventional procedures.

DETAILED DESCRIPTION OF THE INVENTION

The ethylene/vinyl acetate/carbon monoxide terpolymers used in this invention usually contain, by weight, about 40–80%, preferably 60–70% ethylene, 15–60%, preferably 20–35% vinyl acetate, and 5–30%, preferably 5–15% carbon monoxide. The carbon monoxide in the terpolymers generates sufficient sulfur cure sites on the terpolymers so that when the terpolymers are cured they result in elastomers having good physical properties.

The terpolymers can be prepared by passing a compressed mixture of ethylene, vinyl acetate and carbon monoxide along with a free radical generating catalyst into an autoclave held at elevated temperature and pressure, for example, 155°–225° C. and 140–250 MPa, while removing product polymer and unreacted monomers at the same rate. Under these conditions about 10% by weight of the monomers fed are converted to polymer. The preparative procedure is more fully described in U.S. Pat. No. 3,780,140 to Hammer and U.S. Pat. No. 2,495,286 to Brubaker, the disclosures of which are incorporated herein by reference. The ethylene/vinyl acetate/carbon monoxide terpolymers are available from E. I. du Pont de Nemours and Company, Wilmington, Del.

The vulcanizing agent that is added to and dispersed in the terpolymer is one of those normally employed in the vulcanization of rubber and can be elemental sulfur or a compound that releases sulfur at vulcanization temperatures, i.e., a sulfur donor, or mixtures thereof, which compounds are well known in the industry. Extensive descriptions of sulfur vulcanizing systems that can be used in this invention have been published, for example, in Hofmann, "Vulcanization and Vulcanizing Agents", Palmerton Pub. Co., N.Y. 1967 and Alliger and Sjothun, "Vulcanization of Elastomers", Reinhold Pub. Corp., N.Y., 1964. Representative vulcanizing agents that release sulfur at vulcanization temperatures include thiuram polysulfides, e.g., dipentamethylene thiuram tetrasulfide or hexasulfide, tetramethyl thiuram disulfide; amine disulfides, e.g., di-morpholyl disulfide; sodium polysulfide, and thioplasts. When the temperature of the terpolymer is increased during vulcanization the sulfur donors liberate part of their loosely bound sulfur which is then consumed in the formation of crosslinks. The amount of vulcanizing agent used to cure the terpolymer can vary widely. Usually about 0.2–5 parts per 100 parts terpolymer of sulfur or about 0.6–15 parts per 100 parts terpolymer of compounds that release sulfur are incorporated in the terpolymer.

Organic accelerators can be, and generally are, used in combination with the vulcanizing agent and dispersed throughout the vulcanizable ethylene/vinyl acetate/carbon monoxide terpolymer in order to shorten the vulcanization times and lower curing temperatures. Further, the amount of vulcanizing agent can be reduced when a conventional curing accelerator is used. Any conventional accelerator or mixtures thereof normally used to vulcanize rubber can be used in the present invention including: the thiazoles; mercapto accelerators such as mercaptobenzothiazole; and sulphenamide accelerators, e.g., derivatives of mercaptobenzothiazole; guanidine accelerators, e.g., diphenylguanidine (DPG) and di-o-tolylguanidine (DOTG); thiurams, such as thiuram monosulfides and thiuram disulfides; and dithiocarbamates. The amount of accelerator used can vary over a wide range and the amount depends on the particular chemical composition, the accelerator and the intended use of the elastomer. Generally, the amount of accelerator used will be from about 0.2–4, preferably 0.5–2 parts, per 100 parts terpolymer.

The vulcanizable compositions of the present invention are made by mixing the ethylene/vinyl acetate/carbon monoxide terpolymer and vulcanizing agent, optionally containing an organic accelerator, in any conventional manner that will disperse the vulcanizing agent throughout the terpolymer. This can be accomplished on a conventional rubber mill or in a Banbury mixer. Normally, the terpolymer and vulcanizing agent are mixed at temperatures, e.g., between about 20°–100° C., below that which would cause curing, and mixing is accomplished in a matter of minutes.

Fillers, processing aids, plasticizers, oils, antioxidants and especially basic metal oxides such as magnesium oxide, calcium oxide, lead oxide and other conventional additives for elastomers, can be added to the terpolymers to further improve its processability or its properties when sulfur cured.

The vulcanizable composition is cured in a conventional manner by heating the compounded terpolymer, usually in a mold (press), to a temperature of from about 100° to 177° C., usually 121° to 160° C., for about 2 to 60, usually 10 to 30 minutes. Tests, as indicated below, show that the resulting vulcanized elastomeric composition has excellent physical properties and performance characteristics. The vulcanized compositions of the present invention can be used for making conveyor belts, hose, and numerous other uses where elastomers have been employed.

For a clearer understanding of the invention the following specific examples are given. Unless otherwise specified, all amounts are given in terms of parts by weight. The physical testing of the unvulcanized and vulcanized mixtures was carried out in accord with the following ASTM methods: Mooney scorch, ASTM D 1646; ODR, ASTM D 2084-75; Properties in Tension, ASTM D 412-75; Tear Strength, ASTM D 624-73; Volume Increase in Oil, ASTM D 471; and Compression Set, ASTM D 395-75.

EXAMPLES 1 AND 2

The following ingredients are mixed to form a uniform blend on a two-roll mixer at a temperature of 38° C. for about 10 minutes.

|  | Example 1 | Example 2 |
|---|---|---|
| Ethylene/vinyl acetate/CO terpolymer* | 100 |  |
| Ethylene/vinyl acetate/CO terpolymer** |  | 100 |
| Dipentamethylenethiuram hexasulfide (Tetrone A) | 2 | 2 |
| SRF carbon black | 40 | 40 |
| MgO | 2 | 2 |
| Low m.w. polyethylene | 3 | 3 |
| Stearic Acid | 1 | 1 |
| Microcrystalline wax | 3 | 3 |
| Pentaerythritol | 3 | 3 |
| m-Phenylene-bis-maleimide | 2 | 2 |

*E 66%/VA 24%/CO 10%
**E 61%/VA 29%/CO 10%

| Mooney Scorch - 121° C. | | |
|---|---|---|
| Minimum | 2 | 4 |
| Minutes to 5 pt. rise | 16 | 18 |
| Minutes to 10 pt. rise | 20 | 22 |

| ODR, 177° C.±1.4°, 100 cycles/min. 30', no warm up | N.m | lbf.in | N.m | lbf.in |
|---|---|---|---|---|
| Minimum Torque | 0.23 | ( 2) | 0.23 | ( 2) |
| Minutes to 2 pt. rise |  | 2.5 |  | 2.5 |
| Torque at 5' | 1.9 | (17) | 2.1 | (19) |
| at 10' | 3.2 | (28) | 3.4 | (30) |
| at 20' | 3.5 | (31) | 3.8 | (34) |
| at 30' | 3.6 | (32) | 4.0 | (35) |
| at 90% | 3.3 | (29) | 3.6 | (32) |
| Minutes to 90% |  | 12 |  | 12.5 |

| Press Cured 15'/177° C. | Example 1 | | Example 2 | |
|---|---|---|---|---|
| S/S, Original | psi | MPa | psi | MPa |
| 100% Modulus, (psi) MPa | ( 900) | 6.2 | ( 680) | 4.7 |
| 200% Modulus, (psi) MPa | (1260) | 8.7 | (1150) | 7.9 |
| 300% Modulus, (psi) MPa | (1600) | 11.0 | (1550) | 10.7 |
| Tensile Strength, (psi) MPa | (1760) | 12.1 | (1760) | 12.1 |
| Elongation at Break, % | 360 |  | 400 |  |
| Hardness, Durometer A | 85 |  | 82 |  |
| Tear Strength, Die C (pli) kN/m | ( 216) | 37.8 | (186) | 32.5 |
| Volume % Increase | | | | |
| 70 hrs/100° C. in ASTM #3 oil | 75 |  | 78 |  |

| S/S, after 14 days at 121° C. air oven | | |
|---|---|---|
| % Tensile Retained | 88 | 96 |
| % Elongation Retained | 31 | 35 |
| ΔHardness, (Shore A Points) | 0 | −1 |

EXAMPLES 3-7

The following ingredients are mixed on a two-roll mixer at a temperature of 35°–40° C. for about 10 minutes to uniformly disperse the materials. The vulcanizable terpolymer is cured in a mold under the conditions described below and physical properties measured.

| Sulfur-Cured Vulcanizates | | | | | |
|---|---|---|---|---|---|
| Examples | 3 | 4 | 5 | 6 | 7 |
| Ethylene 61%/vinyl acetate 29%/carbon monoxide 10% | 100 | → | → | → | → |
| SRF Black | 50 | → | → | → | → |
| Tris(Nonyl Phenyl Phosphite) | 1 | → | → | → | → |
| 4,4'-Butylidene-bis-(3-methyl-6-tert-butyl-phenol) | 1 | → | → | → | → |
| MgO (Maglite D) | 4 | → | → | → | → |
| N,N'-Di-o-tolyl-guanidine | 0.75 | → | → | → | → |
| Sulfur | 1.0 | → | → | → | → |
| Tetramethyl thiuram monosulfide | 1.75 | 1.75 | | | |
| Di-2-benzothiazyl disulfide | | | 1.75 | | |
| Tetraethyl thiuram disulfide | | | | 1.75 | |
| N-Oxydiethylene-2-benzothiazole sulfenamide | | | | | 1.75 |
| Cure Conditions | | | | | |
| Time, Min | 30 | → | → | → | → |
| Temp. °C. | 121 | 121 | 160 | 160 | 160 |

| Vulcanizate Properties | Example 3 | Example 4 | Example 5 |
|---|---|---|---|
| $M_{100}$, MPa (psi) | 3.6( 525) | 5.0( 725) | 6.4( 925) |
| $M_{200}$, MPa (psi) | 5.9( 850) | 8.8(1275) | 11.2(1625) |
| $M_{300}$, MPa (psi) | 7.4(1075) | 10.9(1200) | 14.0(2025) |
| $T_B$, MPa (psi) | 8.6(1250) | 12.9(1875) | 14.3(2075) |
| $E_B$, % | 445 | 420 | 310 |
| Permanent Set, % | 209 | 66 | 43 |
| Shore A Hardness | 84 | 85 | 84 |
| Comp. Set, 22 hrs/70° C., % | 91 | 91 | 63 |

| Vulcanizate Properties | Example 6 | Example 7 |
|---|---|---|
| $M_{100}$, MPa (psi) | 6.4( 925) | 7.2(1050) |
| $M_{200}$, MPa (psi) | 11.7(1700) | 12.2(1775) |
| $M_{300}$, MPa (psi) | — | 14.7(2125) |
| $T_B$, MPa (psi) | 13.8(2000) | 15.2(2200) |
| $E_B$, % | 275 | 320 |
| Permanent Set, % | 37 | 45 |
| Shore A Hardness | 84 | 85 |
| Comp. Set, 22 hrs/70° C., % | 83 | 73 |

| Mooney Scorch - 121° C. | | | | | |
|---|---|---|---|---|---|
| Examples | 3 | 4 | 5 | 6 | 7 |
| Min. Viscosity, points | 2.5 | 5.7 | 4.5 | 4.5 | 4.5 |
| Time to 10-point Rise, (min.) | 7.25 | 1.5 | 7.5 | 5.75 | 8.75 |

EXAMPLE 8

This example shows that ethylene/vinyl acetate/carbon monoxide terpolymers can be cured using sulfur donor systems. Compositions and properties are given below.

TABLE

| Ingredients (parts by weight) | Example 8 |
|---|---|
| E 66%/VA 23%/CO 11% | 100 |
| SFR Black (N-774) | 35 |
| Hexamethylene Tetramine, 65% Dispersion in Binder | 1.5 |
| Poly(ethylene Oxide) Glycol, 4000 Mol. Wt. | 1 |
| Tetraethyl Thiuram Disulfide | 1 |
| Compound Properties | |
| Mooney Scorch at 121° C. Time to 5-Point Rise, Min. | 30+ |
| ODR Torque at 162° C. 30 Min., lbf . in | 64 |
| Cured Properties | |
| Cure Temperature, °C. | 162 |
| Cure Time, Min. | 15 |
| Tensile Strength, MPa | 9.4 |
| % Elongation | 110 |
| Modulus at 100% Stress, MPa | 8.3 |
| Shore A Hardness | 90 |

I claim:

1. A vulcanizable composition comprising an ethylene/vinyl acetate/carbon monoxide terpolymer containing about 15–60% by weight vinyl acetate and about 5–30% by weight carbon monoxide and, dispersed therein, a vulcanizing agent selected from elemental sulfur, a compound that releases sulfur at vulcanization temperatures and mixtures thereof.

2. A vulcanizable composition of claim 1 wherein the terpolymer contains, by weight, about 40–80% ethylene and about 15–60% vinyl acetate.

3. A vulcanizable composition of claim 2 wherein the amount of vulcanizing agent in the terpolymer is about 0.2–5 parts sulfur per 100 parts terpolymer or about 0.6–15 parts per 100 parts terpolymer of a compound that releases sulfur at vulcanization temperatures.

4. A vulcanizable composition of claim 2 containing about 0.2–5 parts sulfur per 100 parts terpolymer.

5. A vulcanizable composition of claim 2 containing about 0.6–15 parts of a compound that releases sulfur at vulcanization temperatures per 100 parts terpolymer.

6. A vulcanizable composition of claim 2 containing an organic accelerator.

7. A vulcanizable composition of claim 5 wherein the vulcanizing agent is dipentamethylenethiuram hexasulfide.

8. A vulcanizable composition of claim 6 wherein the accelerator is di-o-tolylguanidine.

9. A vulcanizable composition of claim 2 wherein the terpolymer contains 5–15% carbon monoxide.

10. A vulcanizable composition of claim 3 wherein the terpolymer contains, by weight, about 60–70% ethylene, about 20–35% vinyl acetate and about 5–15% carbon monoxide.

11. A vulcanizable composition of claim 5 wherein the vulcanizing agent is tetraethyl thiuram disulfide.

* * * * *